United States Patent [19]
Camras

[11] 3,984,625
[45] Oct. 5, 1976

[54] PORTABLE VIDEO RECORDING SYSTEM EMPLOYING CAMERA AND RECORDING STATIONS CONNECTED BY A WIRELESS LINK

[75] Inventor: Marvin Camras, Glencoe, Ill.

[73] Assignee: IIT Research Institute, Chicago, Ill.

[22] Filed: July 15, 1974

[21] Appl. No.: 488,466

Related U.S. Application Data

[60] Continuation of Ser. No. 237,220, March 22, 1972, abandoned, which is a continuation of Ser. No. 889,775, Dec. 11, 1969, abandoned, which is a division of Ser. No. 545,050, April 22, 1966, Pat. No. 3,484,546.

[52] U.S. Cl. .................. 178/5.6; 178/6.8; 178/6.6 A; 178/DIG. 23; 178/69.5 F; 360/69; 358/4

[51] Int. Cl.² .......................... H04N 5/76

[58] Field of Search ............ 178/5.2, 5.4 CR, 6.6 A, 178/DIG. 1, 6, 5.6, 6.8, 5.8, DIG. 23, DIG. 38; 328/37, 64, 66, 309, 311, 392; 343/202, 226, 228; 360/33, 69, 74; 358/4

[56] References Cited
UNITED STATES PATENTS

| | | | |
|---|---|---|---|
| 2,949,605 | 8/1960 | Graziano et al. | 358/4 |
| 3,358,235 | 12/1967 | Powell | 325/64 |
| 3,359,364 | 12/1967 | Kihara | 358/4 |

OTHER PUBLICATIONS

Mayers et al., Closed Circuit TV System Planning, Rider Publisher, Inc., New York, 1957, pp. 186,187.

*Primary Examiner*—Robert L. Richardson
*Attorney, Agent, or Firm*—Hill, Gross, Simpson, Van Santen, Steadman, Chiara & Simpson

[57] ABSTRACT

A portable video recording system, particularly for amateur video recording operations and the like, employing a camera station and a recording station which are physically separated from one another and connected over a wireless link, the camera station being of a size to be readily manually carried on the person and designed merely to produce video and associated signals and transmit the same by radiation of a high frequency carrier signal to the recording station, and processed by receiving means thereat to derive the signals to be recorded, the recorder being operatively controlled from the camera station, whereby both camera and the recorder of the remote recording station are under the control of the camera operator.

3 Claims, 3 Drawing Figures

PORTABLE VIDEO RECORDING SYSTEM EMPLOYING CAMERA AND RECORDING STATIONS CONNECTED BY A WIRELESS LINK

CROSS-REFERENCES TO RELATED APPLICATIONS

The present application is a continuation of application Ser. No. 237,220 filed Mar. 22, 1972, now abandoned, which was a continuation of application Ser. No. 889,775 filed Dec. 11, 1969 now abandoned, which was a division of copending application Ser. No. 545,050 filed Apr. 22, 1966 now U.S. Pat. No. 3,484,546 dated Dec. 16, 1969.

SUMMARY OF THE DISCLOSURE

The invention is directed to a portable video recording system, particularly for amateur video recording operations, in which the operator is provided with an independent and self-contained video camera station which he may readily carry about without difficulty, operating the same at will, with the recording operations taking place at a recording station remote from the camera station and connected therewith only over a wireless link employing high frequency radiated signals. The arrangement is such that the recorder at the remote recording station is under the control of the camera operator whereby the recorder will be actuated only when the camera is in operation.

As a result of this arrangement, both the camera station and the recording station may be of optimum construction for the specific purposes involved. Thus the camera's station may be small, extremely lightweight, incorporating merely the video camera, a transmitter for transmitting signals by radiation to the recording station, and means for supplying the necessary synchronizing and control signals both for the production of the video signals at the camera and for transmission to the recorder for use thereat. All of such components may be readily miniaturized whereby the camera station, including its power supply, may, for example, take the form of a single hand held structure no larger than comparable movie cameras. Likewise, as it is unnecessary to design the recording station as a continuously manually carried portable structure, it may be appropriately designed for optimum performance, consistent with being adequately portable whereby it may be carried to a suitable location but not required to be carried continuously along with the camera.

BRIEF DESCRIPTION OF THE DRAWINGS

In the drawing, wherein like reference characters indicate like or corresponding parts.

DETAILED DESCRIPTION OF THE INVENTION

The present invention may employ camera and recording systems of the type illustrated in Camras U.S. Pat. No. 3,484,546, previously referred to, wherein will be found a complete description of the present invention and the camera and recording systems referred to, and which patent is hereby incorporated herein by reference.

Figure 1:
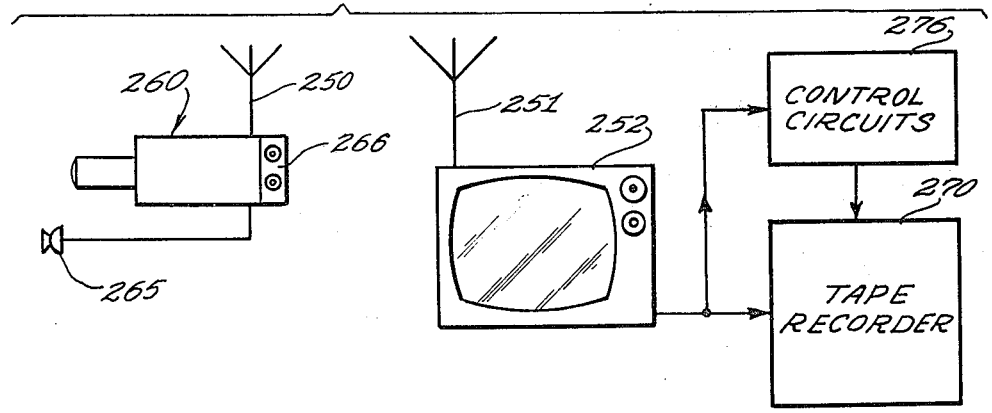
FIG. 1 illustrates a portable video recording system in accordance with the present invention and corresponds to FIG. 10 of U.S. Pat. No. 3,484,546.

FIG. 1 illustrates a portable camera station, indicated generally by the reference numeral 260, hereinafter referred to generally by the term "camera", which for the purposes of explanation will be assumed to be a color camera and adapted to generate a standard NTSC modulated carrier, as with conventional color camera outputs. The carrier output from the camera may be of a proper frequency and of low power for feeding via the antenna such as indicated at 250 in FIG. 1 to the antenna 251 of a standard NTSC color television receiver 252. The carrier may be in a VHF or UHF channel not being used by television broadcasters in the vicinity. A portable camera 260 in accordance with the present invention may be battery operated and may include a microphone 265 for sound pick-up and suitable control circuits such as indicated at 266 for controlling a color or monochrome tape recorder such as indicated at 270. Thus, the camera 260 can be quite portable, and handled in the same way as a film camera. The control signal may be transmitted by the antenna 250 on a sub-carrier, for example, and may be supplied to a control circuit 276 at the receiver for starting and stopping the recorder 270 and the like. The receiver and recorder may also be portable, and located nearby in an automobile or boat, or may be set on the ground or carried by a shoulder strap. The camera may include a miniature monitoring kinescope if desired.

Figure 2:
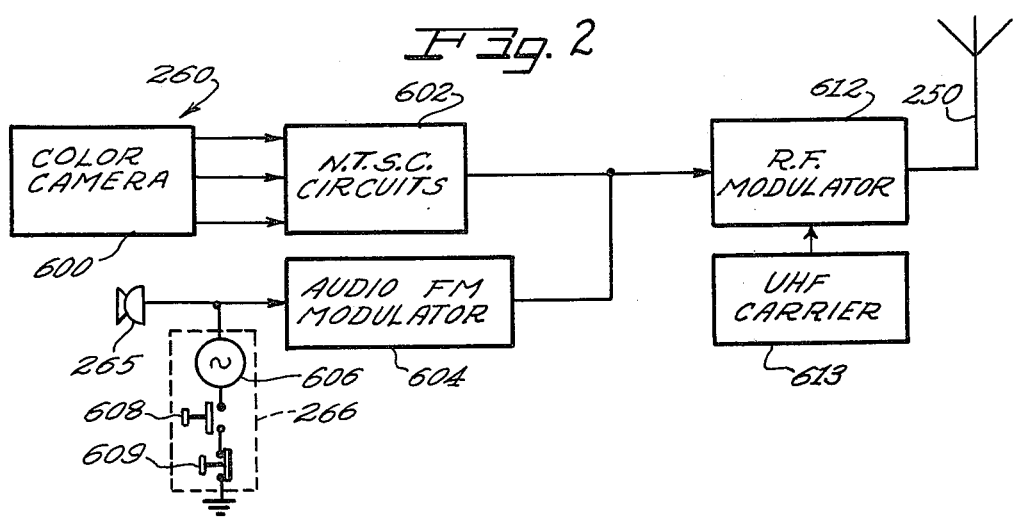
FIG. 2 is a diagrammatic view giving an example of camera circuitry in accordance with the embodiment of FIG. 1 and corresponds to FIG. 20 of such patent.
Figure 3:
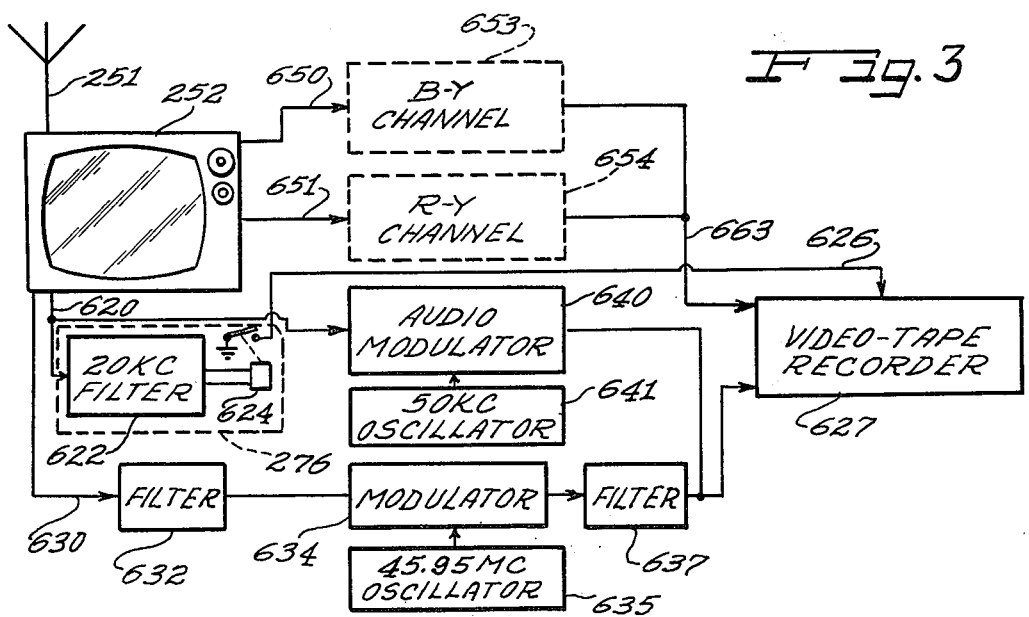
FIG. 3 is a diagrammatic view giving an example of receiver circuitry in accordance with the embodiment of FIG. 1 and corresponds to FIG. 21 of such patent.

FIG. 2 illustrates certain details relative to the embodiment of FIG. 1 and illustrates a color camera 600 which may supply component signals such as red, green and blue signals, or —Y, R—Y, and G—Y signals. These signals are supplied to conventional means 602 for composing a broadcast color television signal for example in accordance with current United States broadcast standards. The audio signal from microphone 265 together with any control signal from component 266 would be supplied to an audio circuit such as indicated at 604 which could comprise the standard circuits for generating a 4.5 megacycle per second audio signal in conventional color television broadcasting. By way of example, a control circuit 266 is illustrated as comprising a source 606 of a suitable frequency such as 20,000 cycles per second or other frequency within the bandpass of the sound channel for transmission by the component 604 along with the audio signal from microphone 265. By way of example, it may be assumed that the presence of the control signal from source 606 might start a suitable color television tape recorder circuit such as indicated in FIG. 3 which tape recorder would continue to operate until the control signal from source 606 was no longer present. Thus push button 608 in FIG. 2 could represent a start button for initiating operation of a remote tape recorder, for example the button 608 being latched in its closed position until a stop button 609 is depressed. Depressing of the stop button 609 momentarily may serve to unlatch the start button 608 returning it to the position shown in FIG. 2, the stop button 609 being spring urged to its closed condition so as to return to the closed condition after manual actuation to stop operation of the remote tape recorder. Components 612 and 613 may represent conventional circuitry for transmitting a color television broadcast signal on a suitable frequency such as an ultra high frequency. The radiated power may, of course, be just sufficient to carry the signal to the desired receiving station such as indicated at 252 in FIGS. 1 and 2. Alternatively, the carrier frequency source 613 may operate at a frequency corresponding to one of the very high frequency television channels which is not being utilized in the vicinity of the camera circuitry 260.

FIG. 3 is also related to FIG. 1 and illustrates a specific receiver arrangement for the camera 260 including the television receiver 252. In the illustrated embodiment, the control signal generated by source 606 in FIG. 2 is shown as being removed by means of a conductor 620 which could be connected to the sound demodulator circuit of the television receiver 252. The demodulated sound and control signal is shown as being supplied by conductor 620 to a filter 622 designed to block the sound signal while transmitting the control frequency to a relay 624. Thus so long as the control button 608 of FIG. 2 is depressed, relay 624 will be held energized and ground will be applied to a conductor 626 leading to a video tape recorder component 627. By way of example, applying ground to conductor 626 may cause the actuation of a relay associated with component 627 which places the video tape recorder 627 into operation. Suitable video tape transports are illustrated in my copending applications Ser. No. 401,832 filed Oct. 6, 1964, Ser. No. 456,192 filed May 17, 1965 and Ser. No. 493,271 filed Oct. 5, 1965. A preferred color television recording system is disclosed in my copending application Ser. No. 528,934 filed Feb. 21, 1966, for example.

It will be apparent that many modifications and variations may be effected without departing from the scope of the novel concepts of the present invention.

I claim as my invention:

1. A portable video recording system, particularly for amateur video recording operations and the like, comprising a video recording station, and an independent and self-contained portable video camera station, the latter being of a size to be readily manually carried on the person and comprising a video camera, a transmitter, for transmitting signals by transmission of a high-frequency carrier signal, means operatively connected to the camera for supplying thereto necessary synchronizing and control signals, whereby there will be produced at said camera video signals in the form of a plurality of scanned lines of video content which are supplied to said transmitter, together with necessary control signals from said signal supply means, for modulation on such high-frequency carrier signal and transmission thereby, manually actuatable means on said camera for controlling the start-stop operation of said camera station, and self-contained power supply means for said camera station; said recording station comprising means for receiving transmitted signals from said camera station, means connected to said receiving means for deriving the video and control signals from the received signals, video-tape recording means to which said received signals are supplied for recording thereat, means at said recording station for supplying to said recording means synchronizing signals corresponding in character and time to those employed in the camera, means for controlling the start-stop operation of said recording means, means operatively connected to said receiving means and to said recorder-controlling means, responsive to start-stop signals from said camera station received by said receiving means, and means for supplying power to said recording station; and means at said camera station, responsive to actuation of said manually actuatable start-stop means thereat for initiating transmission of start-stop signals to said recording station, operative to control said recorder start-stop control means thereat, whereby said recorder is operatively recording only when said camera is in operation.

2. A portable video camera station, for use with a cooperable video recording station connected therewith by only a wireless link and adapted to receive, process and record radiated signals from such camera station, and including start-stop means controlling the recording operation under control of the camera station, particularly for amateur video recording operations and the like, in the form of an independent and self-contained portable video camera station, of size to be readily manually carried on the person and comprising a video camera, a transmitter, for transmitting signals by transmission of a high-frequency carrier signal, means operatively connected to the camera for supplying thereto necessary synchronizing and control signals, whereby there will be produced at said camera video signals in the form of a plurality of scanned lines of video content which are supplied to said transmitter, together with necessary control signals from said signal supply means, for modulation on such high-frequency carrier signal and transmission thereby, manually actuatable means on said camera for controlling the start-stop operation of said camera station, and means responsive to actuation of said manually actuatable start-stop means for initiating transmission of signals to such a recording station for controlling the start-stop control means thereat, whereby said recorder is operatively recording only when said camera is in operation, and self-contained power supply means for said camera station.

3. A video recording station, for use with and control by a cooperable portable video camera station connected therewith by only a wireless link and adapted to produce video and control signals and transmit the same to the recording station for use in recording thereat, particularly for amateur video recording operations and the like, comprising means for receiving transmitted signals from such a camera station, means connected to said receiving means for deriving the video and control signals, from such received signals, video-tape recording means to which such received signals are supplied for recording thereat, for supplying to said recording means synchronizing signals corresponding in character and time to those employed in such a camera, means for controlling the start-stop operation of said recording means, means operatively connected to said receiving means and to said recorder-controlling means, resonsive to start-stop signals from such a camera station received by said receiving means for controlling said start-stop control means, whereby the recorder start-stop operation is controlled by such a camera station and said recorder is operatively recording only when such camera is in operation, and means for supplying power to said recording station.

* * * * *